(12) United States Patent
Akkapeddi

(10) Patent No.: US 12,468,584 B2
(45) Date of Patent: Nov. 11, 2025

(54) DETERMINING AND MANAGING INTERACTIONS BETWEEN APPLICATION SUB-SYSTEMS USING MACHINE LEARNING

(71) Applicant: Bank of America Corporation, Charlotte, NC (US)

(72) Inventor: Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 480 days.

(21) Appl. No.: 18/048,697

(22) Filed: Oct. 21, 2022

(65) Prior Publication Data

US 2024/0134722 A1 Apr. 25, 2024
US 2024/0231966 A9 Jul. 11, 2024

(51) Int. Cl.
*G06F 9/54* (2006.01)
(52) U.S. Cl.
CPC ................... *G06F 9/546* (2013.01)
(58) Field of Classification Search
None
See application file for complete search history.

(56) References Cited

U.S. PATENT DOCUMENTS

| | | | |
|---|---|---|---|
| 6,714,544 B1 * | 3/2004 | Bosloy | H04L 12/5601 370/395.5 |
| 8,225,308 B2 | 7/2012 | Sedukhin et al. | |
| 8,856,313 B2 | 10/2014 | Amini et al. | |
| 9,734,195 B1 | 8/2017 | Pandit et al. | |
| 10,706,156 B2 | 7/2020 | Bhalla et al. | |
| 11,196,547 B2 | 12/2021 | Radhakrishnan et al. | |
| 11,347,482 B2 | 5/2022 | Seetharaman et al. | |
| 11,379,219 B2 | 7/2022 | Bhalla et al. | |
| 2003/0172368 A1 | 9/2003 | Alumbaugh et al. | |
| 2007/0150330 A1 | 6/2007 | Mcgoveran | |
| 2007/0162890 A1 | 7/2007 | Meier et al. | |

(Continued)

FOREIGN PATENT DOCUMENTS

| CN | 101094173 A | 12/2007 |
|---|---|---|
| CN | 105339896 A | 2/2016 |

*Primary Examiner* — Umut Onat

(57) ABSTRACT

A system and method for determining and managing interactions between application sub-systems. The method includes receiving plan identification information from a source application sub-system. One or more rule sets are applied to the plan identification information to determine: source and destination application sub-systems, a set of intermediate application sub-systems, and a sequence of connections determining a connection path from the source application sub-system to the destination application sub-system via the set of intermediate application sub-systems. A sequence of instructions is generated based on one or more of the source application sub-system, the destination application sub-system, the set of intermediate application sub-systems, and the sequence of connections. A first instruction is sent to the source application sub-system, which instructs the source application sub-system to: open a first connection between the source application sub-system and a first intermediate application sub-system, transfer first data via the first connection, and close the first connection.

20 Claims, 3 Drawing Sheets

(56) References Cited

U.S. PATENT DOCUMENTS

| | | | |
|---|---|---|---|
| 2013/0332423 A1 | 12/2013 | Puri et al. | |
| 2017/0041216 A1* | 2/2017 | Fu | H04L 45/22 |
| 2017/0195253 A1 | 7/2017 | Annaluru et al. | |
| 2017/0300540 A1 | 10/2017 | Karpistsenko et al. | |
| 2019/0109797 A1* | 4/2019 | Thubert | H04L 49/35 |
| 2020/0388153 A1* | 12/2020 | Cajias | G01C 21/32 |

* cited by examiner

DETERMINING AND MANAGING INTERACTIONS BETWEEN APPLICATION SUB-SYSTEMS USING MACHINE LEARNING

TECHNICAL FIELD

The present disclosure relates generally to interactions between various application sub-systems, and more specifically to a system and method for determining and managing interactions between application sub-systems using machine learning.

BACKGROUND

In a system that includes a plurality of application sub-systems, data may need to pass through many application sub-systems to achieve desired transformations, enrichments, or error corrections. Generally, a data path through the application sub-systems is predefined and connections between the application sub-systems remain active all or most of the time, which leads to increased utilization of computing resources, such as a memory and a network bandwidth.

SUMMARY

The system described in the present disclosure provides several practical applications and technical advantages that overcome the current technical problems as described herein. The following disclosure is particularly integrated into practical applications of reducing utilization of computing resources (such as, for example, a memory and a network bandwidth) when an interaction (such as, for example, data transfer) is performed by a system that includes a plurality of application sub-systems.

In an example operation, during a data transfer process, data may need to pass through many application sub-systems to achieve desired transformations, enrichments, or error corrections. Generally, a data path through the application sub-systems is predefined and connections between the application sub-systems remain active all or most of the time, which leads to inefficient utilization of the computing resources. For example, even though some of the connections may not be in use during the data transfer process, portions of the memory and network bandwidth are still allocated to these unused connections.

The disclosed system is configured to implement an artificial intelligence/machine learning module to determine and manage interactions between application sub-systems. For example, the disclosed system includes a control sub-system that is communicatively coupled to the application sub-systems. The control sub-system is configured to receive plan identification information from a source application sub-system of the plurality of application sub-systems. The plan identification information includes information about an interaction (for example, data transfer) initiated by the source application sub-system. The control sub-system is further configured to apply the one or more rule sets to the plan identification information to determine a sequence of connections determining a connection path from the source application sub-system to a destination application sub-system via a set of intermediate application sub-systems. The control sub-system is further configured to generate a sequence of instructions based on one or more of the source application sub-system, the destination application sub-system, the set of intermediate application sub-systems, and the sequence of connections, such that each instruction is associated with a respective connection. The control sub-system is further configured to send the instructions in a sequential manner to the source application sub-system and the set of intermediate application sub-systems, such that each instruction instructs a respective application sub-system to: open a respective connection between the respective application sub-system and a next application sub-system according to the connection path, transfer respective data from the respective application sub-system to the next application sub-system via the respective connection, and close the respective connection.

By determining the connection path after initiating the interaction and sequentially opening and closing the determined connections between application sub-systems, the disclosed system improves utilization of the computing resources (such as, for example, a memory and a network bandwidth). For example, by closing connections after respective interactions are completed, portions of the memory and network bandwidth that are allocated to these connections are released and may be used by the system for other operations. Accordingly, the disclosed system is integrated into a practical application of improving efficiency of interactions performed by the plurality of application sub-systems by efficiently utilizing computing resources.

In one embodiment, a system includes a plurality of application sub-systems and a control sub-system communicatively coupled to the plurality of application sub-systems. The control sub-system includes a first memory storing one or more rule sets and a first processor communicatively coupled to the first memory. The first processor is configured to receive plan identification information from a source application sub-system of the plurality of application sub-systems. The plan identification information includes information about an interaction initiated by the source application sub-system. The first processor is further configured to apply the one or more rule sets to the plan identification information to determine: the source application sub-system from the plurality of application sub-systems, a destination application sub-system from the plurality of application sub-systems, a set of intermediate application sub-systems from the plurality of application sub-systems, and a sequence of connections determining a connection path from the source application sub-system to the destination application sub-system via the set of intermediate application sub-systems. The first processor is further configured to generate a sequence of instructions based on one or more of the source application sub-system, the destination application sub-system, the set of intermediate application sub-systems, and the sequence of connections. Each instruction is associated with a respective connection. The first processor is further configured to send a first instruction of the sequence of instructions to the source application sub-system, the first instruction being associated with a first connection of the sequence of connections between the source application sub-system and a first intermediate application sub-system of the set of intermediate application sub-systems. The first instruction instructs the source application sub-system to: open the first connection between the source application sub-system and the first intermediate application sub-system, transfer first data from the source application sub-system to the first intermediate application sub-system via the first connection, and close the first connection. The first processor is further configured to send a second instruction of the sequence of instructions to a last intermediate application sub-system of the set of intermediate application sub-systems, the second instruction being associated with a second connection of the sequence of connections between the last intermediate application sub-system and the destination application sub-system. The second instruction instructs the last application sub-system to: open the second connection of the sequence of connections between the last intermediate application sub-system and the destination application sub-system, transfer second data from the last intermediate application sub-system to the destination application sub-system via the second connection, and close the second connection.

The above embodiment is integrated into a practical application of efficient utilization of computing resources (such as, for example, a memory and a network bandwidth) while the system performs an interaction (such as data transfer). By determining the connection path after initiating the interaction and sequentially opening and closing the determined connections between application sub-systems, the disclosed system improves utilization of the computing resources. For example, by closing connections after respective data transfers are completed, portions of the memory and network bandwidth that are allocated to these connections are released, which leads to efficient utilization of the computing resources.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
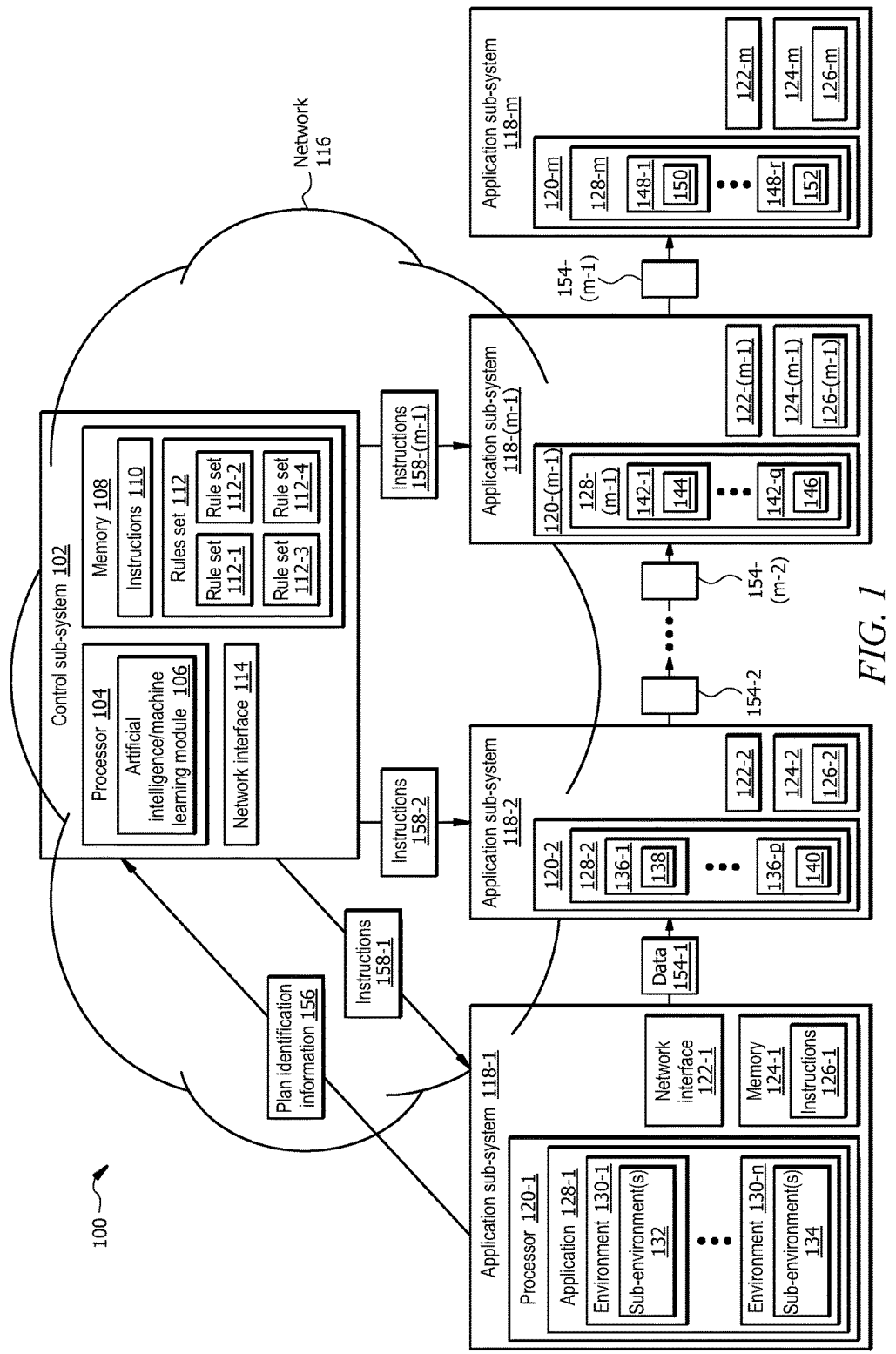
FIG. 1 illustrates an embodiment of a system configured to determine and manage interactions between application sub-systems using machine learning.
Figure 2A:
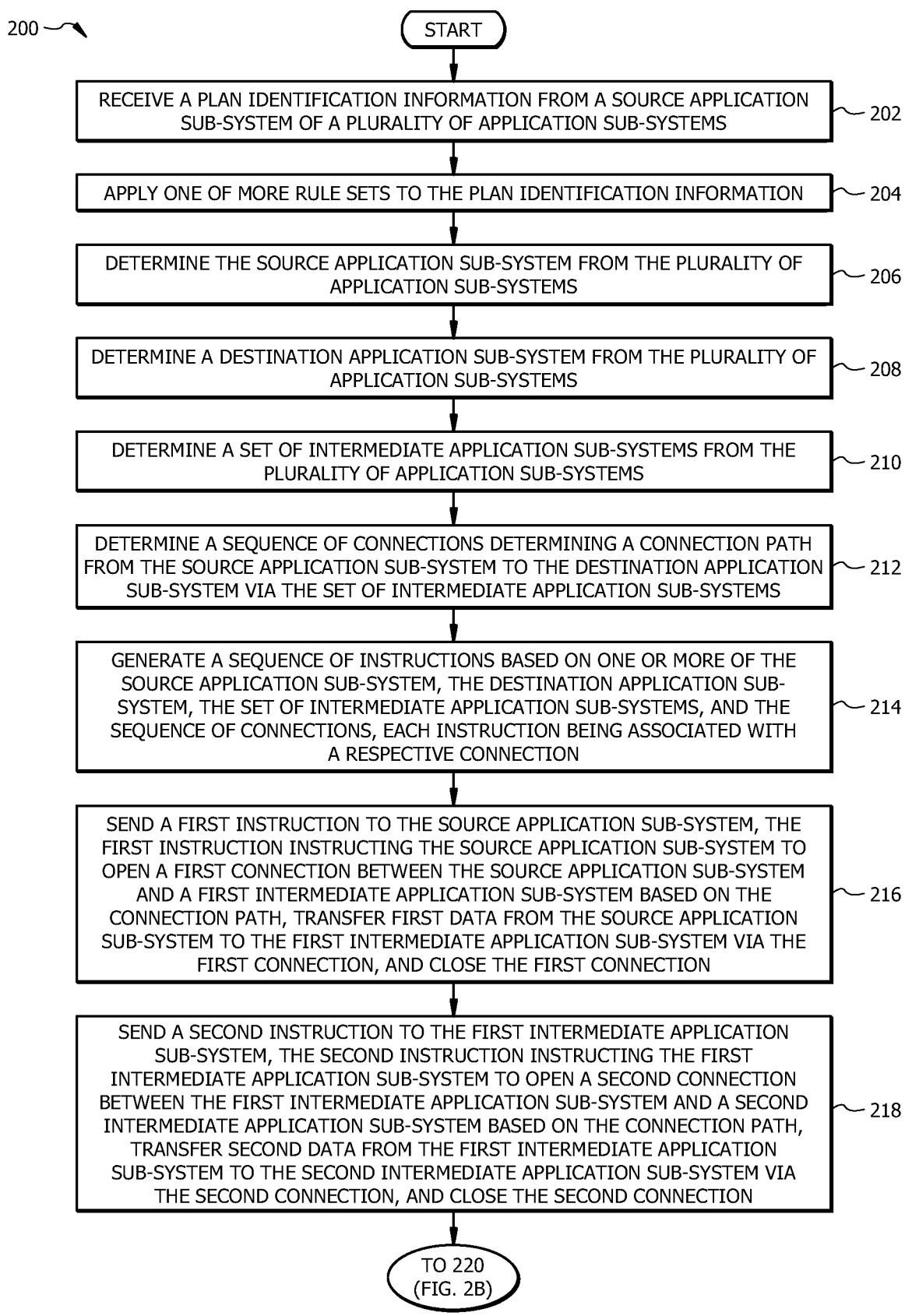
FIGS. 2A and 2B illustrate an example operational flow of system of FIG. 1 for determining and managing interactions between application sub-systems using machine learning.
Figure 2B:
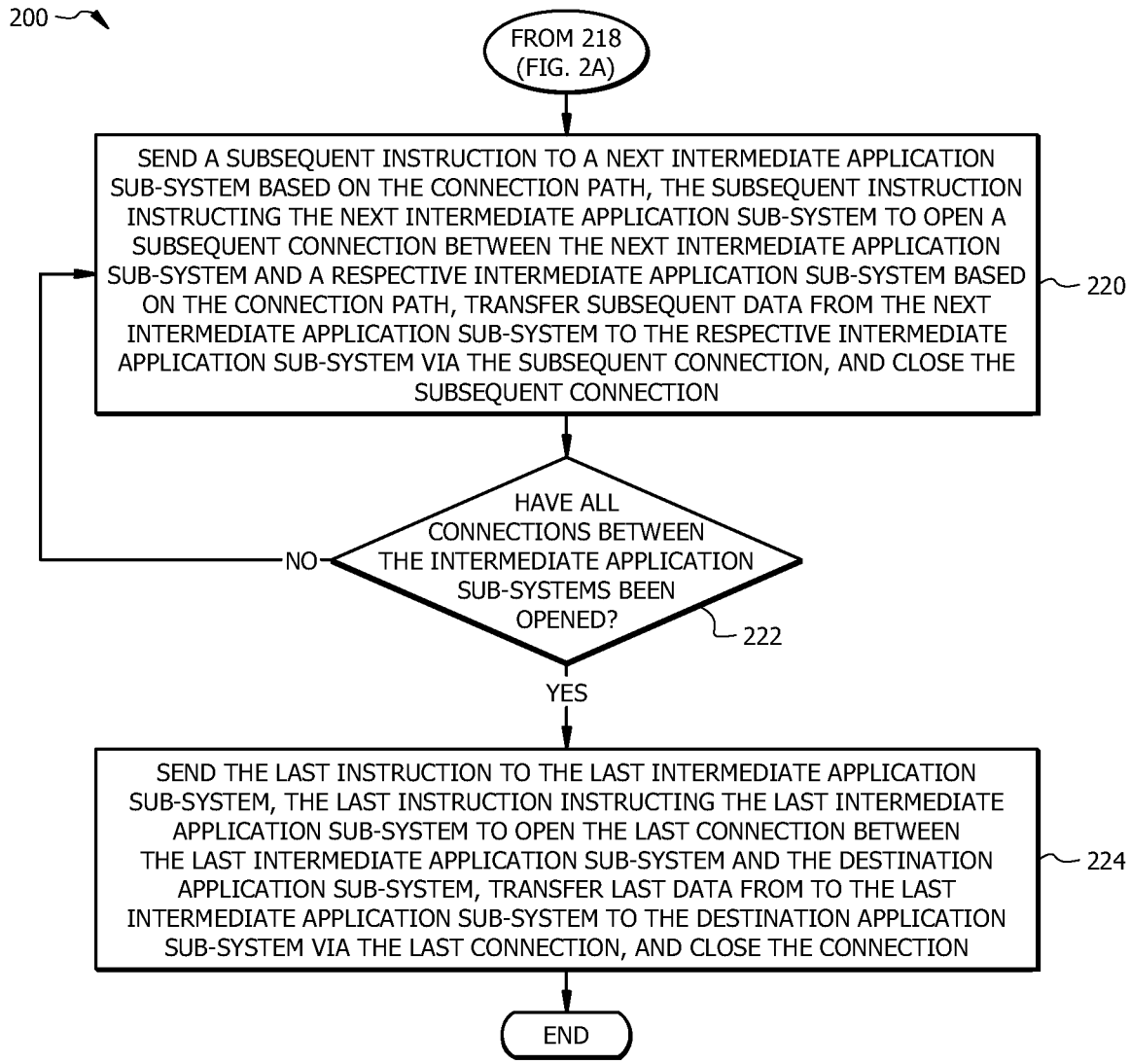

As described above, previous technologies fail to provide efficient and reliable solutions to determine and manage interactions between application sub-systems. Embodiments of the present disclosure and its advantages may be understood by referring to FIGS. 1, 2A and 2B. FIGS. 1, 2A and 2B are used to describe a system and method for determining and managing interactions between application sub-systems.

System Overview

FIG. 1 illustrates an embodiment of a system 100 that is generally configured to determine and manage interactions between application sub-systems. In general, a control sub-system of system 100 receives plan identification information that includes information about an interaction initiated by a source application sub-system. Based on the plan identification information, the control sub-system determines a sequence of connections determining a connection path from the source application sub-system to a destination application sub-system via a set of intermediate application sub-systems. The control sub-system generates a sequence of instructions based on one or more of the source application sub-system, the destination application sub-system, the set of intermediate application sub-systems, and the sequence of connections, such that each instruction is associated with a respective connection. The control sub-system sends the instructions in a sequential manner to the source application sub-system and the set of intermediate application sub-systems, such that each instruction instructs a respective application sub-system to: open a respective connection between the respective application sub-system and a next application sub-system according to the connection path; perform a respective interaction between the respective application sub-system and the next application sub-system via the respective connection; and close the respective connection.

In certain embodiments, the system 100 comprises a control sub-system 102 that is operably coupled to a plurality of application sub-systems 118 (e.g., application sub-systems 118-1 through 118-$m$) via a network 116. Network 116 enables the communication between the components of the system 100. Control sub-system 102 comprises a processor 104 in signal communication with a memory 108. Memory 108 stores software instructions 110 that when executed by the processor 104, cause the control sub-system 102 to execute the operations described herein. In one embodiment, processor 104 executes software instructions 110 to implement an artificial intelligence/machine learning module 106 that determines and manages interactions between the application sub-systems 118. In other embodiments, the system 100 may not have all the components listed and/or may have other elements instead of, or in addition to, those listed above. For example, the control sub-system 102 may be integrated into any of the application sub-systems 118. In such embodiments, the artificial intelligence/machine learning module 106 may be implemented by any of processors 120 of the application sub-systems 118.

System Components

Network

Network 116 may be any suitable type of wireless and/or wired network. The network 116 may or may not be connected to the Internet or public network. The network 116 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth™ network, a near field communication (NFC) network, and/or any other suitable network. The network 116 may be configured to support any suitable type of communication protocol as would be appreciated by one of ordinary skill in the art.

Application Sub-Systems

Each of the plurality of application sub-systems 118 (e.g., application sub-systems 118-1 through 118-$m$) is generally any device that is configured to process data and communicate with other components of the system 100 via the network 116. Each of the application sub-systems 118 comprises a respective one of processors 120 (e.g., processors 120-1 through 120-$m$) in signal communication with a respective one of memories 124 (e.g., memories 124-1 through 124-$m$) and a respective one of network interfaces 122 (e.g., network interfaces 122-1 through 122-$m$).

Each of the processors 120 comprises one or more processors operably coupled to a respective one of the memories 124. Each of the processors 120 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 120 may be a programmable logic device, a microcontroller, a microprocessor, or any suitable combination of the preceding. The one or more processors are configured to process data and may be implemented in hardware or software. For example, each of the processors 120 may be 8-bit, 16-bit, 32-bit, 64-bit, or of any other suitable architecture. Each of the processors 120 is configured to implement various software instructions. For example, each of the processors 120 is configured to execute respective ones of software instructions 126 (e.g., software instructions 126-1 through 126-$m$) that is stored in a respective one of the memories 124 in order to perform the operations described herein.

Each of the network interfaces 122 is configured to enable wired and/or wireless communications (e.g., via network 116). Each of the network interfaces 122 is configured to communicate data between a respective one of the application sub-system 118 and other components of the system 100. For example, each of the network interfaces 122 may comprise a WIFI interface, a local area network (LAN) interface, a wide area network (WAN) interface, a modem, a switch, or a router. Each of the network interfaces 122 may be configured to use any suitable type of communication protocol as would be appreciated by one of ordinary skill in the art. The suitable communication protocols may comprise HTTPs, JMS, SOAP, JSON, JDBC, File, or the like. The suitable transport layers may comprise TLS, SSL, (OAUTH, Certs), or the like. Data security may be achieved using suitable digital signatures, digital certificates, and encryptions.

Each of the memories 124 may be volatile or non-volatile and may comprise a read-only memory (ROM), random-access memory (RAM), ternary content-addressable memory (TCAM), dynamic random-access memory (DRAM), and static random-access memory (SRAM). Each of the memories 124 may be implemented using one or more disks, tape drives, solid-state drives, and/or the like. Each of the memories 124 is operable to store respective ones of software instructions 126, and/or any other data and instructions. Each of the software instructions 126 may comprise any suitable set of software instructions, logic, rules, or code.

In certain embodiments, each of the processors 120, when executing respective ones of software instructions 126, implements a respective one of the applications 128 (e.g., applications 128-1 through 128-$m$). Each of the applications 128 may comprises one or more environments, such that each of the one or more environments in turn may comprise one or more sub-environments. The environments and sub-environments may provide a specific functionality to a respective application.

For example, the application 128-1 of application sub-system 118-1 comprises a plurality of environments 130 (e.g., environments 130-1 through 130-$n$). The environment 130-1 comprises one or more sub-environments 132. The environment 130-$n$ comprises one or more sub-environments 134. The one or more sub-environments 132 may be different from the one or more sub-environments 134.

For example, the application 128-2 of application sub-system 118-2 comprises a plurality of environments 136 (e.g., environments 136-1 through 136-$p$). The environment 136-1 comprises one or more sub-environments 138. The environment 136-$p$ comprises one or more sub-environments 140. The one or more sub-environments 138 may be different from the one or more sub-environments 140. The number p of the plurality of environments 136 may be different from the number n of the plurality of environments 130.

The application 128-($m$-1) of application sub-system 118-($m$-1) comprises a plurality of environments 142 (e.g., environments 142-1 through 142-$q$). The environment 142-1 comprises one or more sub-environments 144. The environment 142-$q$ comprises one or more sub-environments 146. The one or more sub-environments 144 may be different from the one or more sub-environments 146. The number q of the plurality of environments 142 may be different from the number p of the plurality of environments 136 and the number n of the plurality of environments 130.

The application 128-$m$ of the application sub-system 118-$m$ comprises a plurality of environments 148 (e.g., environments 148-1 through 148-$r$). The environment 148-1 comprises one or more sub-environments 150. The environment 148-$r$ comprises one or more sub-environments 152. The one or more sub-environments 150 may be different from the one or more sub-environments 152. The number r of the plurality of environments 148 may be different from the number q of the plurality of environments 142, the number p of the plurality of environments 136, and the number n of the plurality of environments 130.

In certain embodiments, the application sub-systems 118 may be configured to send information (e.g., plan identification information 156) to the control sub-system 102, receive a plurality of instructions 158 (e.g., instructions 158-1 through 158-($m$-1)) from the control sub-system 102, and transfer data (e.g., data 154-1 through 154-$r$) between respective application sub-systems in response to receiving the instructions 158.

The plan identification information 156 may comprise information about an interaction initiated by a source application sub-system (e.g., the application sub-system 118-1). For example, the plan identification information 156 may identify the source application sub-system (e.g., the application sub-system 118-1), and an environment (e.g., environment 130-1) and a sub-environment (e.g., sub-environment 132) of a respective application (e.g., application 128-1). The plan identification information 156 may also identify a destination application sub-system (e.g., the application sub-system 118-$m$), and an environment (e.g., environment 148-1) and a sub-environment (e.g., sub-environment 150) of a respective application (e.g., application 128-$m$). The plan identification information 156 may further identify data (e.g., data 154-1) that is desired by the source application sub-system to transfer to the destination application. For example, the data may be generated by the identified sub-environment of the source application sub-system. As describe below in greater detail, the data may pass through various application sub-systems and may undergo various transformations before reaching the destination application sub-system.

Control Sub-System

The control sub-system 102 is generally any device that is configured to process data and communicate with other components of the system 100 via the network 116. The control sub-system 102 may comprise a processor 104 in signal communication with a memory 108 and a network interface 114.

Processor 104 comprises one or more processors operably coupled to the memory 108. The processor 104 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 104 may be a programmable logic device, a microcontroller, a microprocessor, or any suitable combination of the preceding. The one or more processors are configured to process data and may be implemented in hardware or software. For example, the processor 104 may be 8-bit, 16-bit, 32-bit, 64-bit, or of any other suitable architecture. The one or more processors are configured to implement various software instructions to perform the operations described herein. For example, the one or more processors are configured to execute software instructions 110 to implement the artificial intelligence/machine learning (AI/ML) module 106 and perform one or more functions described herein. In this way, processor 104 may be a special-purpose computer designed to implement the functions disclosed herein. The processor 104 is configured to operate as described in FIGS. 1, 2A and 2B.

Network interface 114 is configured to enable wired and/or wireless communications (e.g., via network 116). The network interface 114 is configured to communicate data between the interaction identification system and other components of the system 100. For example, the network interface 114 may comprise a WIFI interface, a local area network (LAN) interface, a wide area network (WAN) interface, a modem, a switch, or a router. The processor 104 is configured to send and receive data using the network interface 114. The network interface 114 may be configured to use any suitable type of communication protocol as would be appreciated by one of ordinary skill in the art.

Memory 108 may be volatile or non-volatile and may comprise a read-only memory (ROM), random-access memory (RAM), ternary content-addressable memory (TCAM), dynamic random-access memory (DRAM), and static random-access memory (SRAM). Memory 108 may be implemented using one or more disks, tape drives, solid-state drives, and/or the like. The memory 108 may store any of the information described in FIGS. 1, 2A and 2B along with any other data, instructions, logic, rules, or code operable to implement the function(s) described herein when executed by processor 104. The memory 108 is operable to store software instructions 110, and/or any other data and instructions. The software instructions 110 may comprise any suitable set of software instructions, logic, rules, or code operable to be executed by the processor 104.

In certain embodiments, the control sub-system 102 may be configured to receive a plan identification information (e.g., plan identification information 156) from a source application sub-system (e.g., application sub-system 118-1) and send a plurality of instructions 158 (e.g., instructions 158-1 through 158-($m$-1)) to respective application sub-systems (e.g., application sub-systems 118-1 through 118-($m$-1)).

The plan identification information 156 may comprise information about an interaction initiated by a source application sub-system (e.g., the application sub-system 118-1). For example, the plan identification information 156 may identify the source application sub-system, and an environment (e.g., environment 130-1) and a sub-environment (e.g., sub-environment 132) of a respective application (e.g., application 128-1). The plan identification information 156 may also identify a destination application sub-system (e.g., the application sub-system 118-$m$), and an environment (e.g., environment 148-1) and a sub-environment (e.g., sub-environment 150) of a respective application (e.g., application 128-$m$). The plan identification information 156 may further identify data (e.g., data 154-1) that is desired by the source application sub-system to transfer to the destination application.

In certain embodiments, the memory 108 is configured to store a plurality of rule sets 112 (e.g., rule sets 112-1 through 112-4). As described below in greater detail, the rule sets 112 are used by the processor 104 to determine interactions between various application sub-systems 118 from the plan identification information 156.

In certain embodiments, the rule set 112-1 may be applied to the plan identification information 156 to determine the source application sub-system (e.g., application sub-system 118-1), the destination application sub-system (e.g., application sub-system 118-$m$), a set of intermediate application sub-systems (e.g., application sub-systems 118-2 through 118-($m$-1)), a sequence of connections determining a connection path from the source application sub-system to the destination application sub-system via the set of intermediate application sub-systems. In the embodiment illustrated in FIG. 1, a combination of the source application sub-system (e.g., application sub-system 118-1), the destination application sub-system (e.g., application sub-system 118-$m$), and the set of intermediate application sub-systems (e.g., application sub-systems 118-2 through 118-($m$-1)) is same as the plurality of application sub-systems 118. In other embodiments, a combination of the source application sub-system, the destination application sub-system, and the set of intermediate application sub-systems may be a sub-set of the plurality of application sub-systems.

In certain embodiments, the rule set 112-2 may be applied to the plan identification information 156 to determine a volume or a frequency for the interaction initiated by the source application sub-system.

In certain embodiments, the rule set 112-3 may be applied to the plan identification information 156 to determine an interaction type for the interaction initiated by the source application sub-system and respective metadata and/or NLP tags for the identified interaction type.

In certain embodiments, the rule set 112-4 may be applied to the plan identification information 156 to determine an environment and a sub-environment for each of the identified source application sub-system, the identified destination application sub-system, and the identified intermediate application sub-systems.

In certain embodiments, the control sub-system 102 may be configured to generate a sequence of instructions 158 (e.g., instructions 158-1 through 158-($m$-1)) based on the identified sequence of connections, identified source and destination application sub-systems, identified intermediate application systems, identified environments, identified sub-environments, identified interaction type, identified metadata, and/or identified NLP tags. Each instruction is associated with a respective connection and is sent to a respective application sub-system (e.g., application sub-systems 118-1 through 118-($m$-1)). In certain embodiments, each instruction instructs the respective application sub-system to open a connection between the respective application sub-system and a next application sub-system based on the connection path, generate data from data received by the respective application sub-system, transfer the generated data from the respective application sub-system to the next application sub-system via the connection, and close the connection. The sequence of instructions 158 cause the application sub-systems 118 to perform the interaction identified by the plan identification information 156.

For example, the instruction 158-1 instructs the source application sub-system (e.g., the application sub-system 118-1) to open a first connection between the source application sub-system and a first intermediate application sub-system (e.g., the application sub-system 118-2) based on the connection path, transfer data 154-1 from the source application sub-system to the first intermediate application sub-system via the first connection, and close the first connection. In certain embodiments, the instruction 158-1 may also instruct the identified sub-environment (e.g., the sub-environment 132) of the source application sub-system to generate the data 154-1. In certain embodiments, instructions to transfer the data 154-1 from the source application sub-system to the first intermediate application sub-system via the first connection may comprise instructions to transfer the data 154-1 from the identified sub-environment (e.g., the sub-environment 132) of the source application sub-system to the identified sub-environment (e.g., the sub-environment 138) of the first intermediate application sub-system via the first connection.

The instruction 158-2 instructs the first intermediate application sub-system (e.g., the application sub-system 118-2) to open a second connection between the first intermediate application sub-system and a second intermediate application sub-system (e.g., the application sub-system 118-3) based on the connection path, transfer data 154-2 from the first intermediate application sub-system to the second intermediate application sub-system via the second connection, and close the second connection. In certain embodiments, the instruction 158-2 may also instruct the identified sub-environment (e.g., the sub-environment 138) of the first intermediate application sub-system to generate the data 154-2 from the data 154-1. In certain embodiments, instructions to transfer data 154-2 from the first intermediate application sub-system to the second intermediate application sub-system via the second connection may comprise instructions to transfer the data 154-2 from the identified sub-environment (e.g., the sub-environment 138) of the first intermediate application sub-system to the identified sub-environment of the second intermediate application sub-system via the second connection. The instructions 158-3 through 158-($m$-2) provide instructions similar to the instruction 158-2 to the application sub-systems 118-3 through 118-($m$-2).

The instruction 158-($m$-1) instructs the last intermediate application sub-system (the application sub-system 118-($m$-1)) to open the last connection between the last intermediate application sub-system and the destination application sub-system (e.g., the application sub-system 118-$m$), transfer data 154-($m$-1) from to the last intermediate application sub-system to the destination application sub-system via the last connection, and close the last connection. In certain embodiments, the instruction 158-($m$-1) may also instruct the identified sub-environment (e.g., the sub-environment 150) of the destination application sub-system to generate data from the data 154-($m$-1). In certain embodiments, transfer data 154-($m$-1) from to the last intermediate application sub-system to the destination application sub-system via the last connection may comprise instructions to transfer the data 154-($m$-1) from the identified sub-environment (e.g., the sub-environment 144) of the last intermediate application sub-system to the identified sub-environment (e.g., the sub-environment 150) of the destination application sub-system via the last connection.

Artificial Intelligence/Machine Learning Module

AI/ML module 106 may be implemented by the processor 104 executing the software instructions 110 and is generally configured determine and manage interactions between the application sub-systems 118 based on the plan identification information 156. In other embodiments, the AI/ML module 106 may be implemented by any of the processors 120 of the application sub-systems 118. In certain embodiments, processor 104 may execute the operations described herein as being associated with AI/ML module 106 without implementing AI/ML module 106 itself.

In certain embodiments, the AI/ML module 106 may be implemented by a support vector machine, neural network, random forest, k-means clustering, etc. In certain embodiments, the AI/ML module 106 may be implemented by a plurality of neural network layers, convolutional neural network layers, Long-Short-Term-Memory (LSTM) layers, Bi-directional LSTM layers, recurrent neural network layers, and the like. In certain embodiments, the AI/ML module 106 may be implemented by a text processing, natural language processing, and the like. In certain embodiments, the AI/ML module 106 may be implemented by unsupervised, semi-supervised, and/or supervised machine learning techniques.

In certain embodiments, the AI/ML module 106 may be implemented by a machine learning algorithm that is executed by processor 104. Machine learning algorithm may be any suitable machine learning algorithm, such as a neural network machine learning algorithm, a naïve bayes algorithm, a nearest neighbor algorithm, a support vector machine, and/or any other suitable machine learning algorithm. Machine learning algorithm may be a supervised machine learning algorithm, an unsupervised machine learning algorithm, a semi-supervised learning algorithm, or a reinforcement learning algorithm.

In certain embodiments, the AI/ML module 106 may be configured to perform operations of method 200 (see FIGS. 2A and 2B) as described below in greater detail. In other embodiments, processor 104 may be configured to perform operations of method 200 without implementing AI/ML module 106 itself.

Example Method for Determining and Managing Interactions Between Application Sub-Systems Using Machine Learning FIGS. 2A and 2B illustrate an example flowchart of a method 200 for determining and managing interactions between application sub-systems using machine learning. Modifications, additions, or omissions may be made to method 200. Method 200 may include more, fewer, or other operations. For example, operations may be performed in parallel or in any suitable order. For example, one or more operations of method 200 may be implemented, at least in part, in the form of software instructions (e.g., any of the instructions 110 and 126 of FIG. 1), stored on non-transitory, tangible, machine-readable medium (e.g., any of the memories 108 and 124 of FIG. 1) that when executed by one or more processors (e.g., any of the processors 104 and 120 of FIG. 1) implements an AI/ML module (e.g., AI/ML module 106 of FIG. 1) and may cause the one or more processors to perform operations 202-224.

At operation 202, the one or more processors receive a plan identification information (e.g., the plan identification information 156 of FIG. 1) from a source application sub-system (e.g., the application sub-system 118-1 of FIG. 1). The plan identification information comprises information about a desired interaction initiated by the source application sub-system.

In certain embodiments, the plan identification information may identify the source application sub-system (e.g., the application sub-system 118-1), and an environment (e.g., environment 130-1) and a sub-environment (e.g., sub-environment 132) of a respective application (e.g., application 128-1). The plan identification information may also identify a destination application sub-system (e.g., the application sub-system **118-*m*), and an environment (e.g., environment 148-1) and a sub-environment (e.g., sub-environment 150) of a respective application (e.g., application 128-*m*). The plan identification information may further identify data (e.g., data 154-1**) that is desired by the source application sub-system to transfer to the destination application.

At operation 204, the one or more processors apply one or more rule sets (e.g., the rule sets 112 of FIG. 1) to the plan identification information.

At operation 206, the one or more processors determine the source application sub-system from the plurality of application sub-systems as a result of operation 204.

At operation 208, the one or more processors determine a destination application sub-system from the plurality of application sub-systems as a result of operation 204.

At operation 210, the one or more processors determine a set of intermediate application sub-systems (e.g., the application sub-systems 118-2 through **118-(*m*-1) of FIG. 1) from the plurality of application sub-systems as a result of operation 204**.

At operation 212, the one or more processors determine a sequence of connections determining a connection path from the source application sub-system to the destination application sub-system via the set of intermediate application sub-systems as a result of operation 204.

In certain embodiments, the one or more processors apply one or more rule sets to the plan identification information to further determine a volume or a frequency for the interaction initiated by the source application sub-system, an interaction type for the interaction initiated by the source application sub-system, metadata and/or NLP tags for the identified interaction type, and an environment and a sub-environment for each of the identified source application sub-system, the identified destination application sub-system, and the identified intermediate application sub-systems.

At operation 214, the one or more processors generate a sequence of instructions (e.g., instructions 158) based on one or more of the identified sequence of connections, identified source and destination application sub-systems, identified intermediate application systems, identified environments, identified sub-environments, identified interaction type, identified metadata, and/or identified NLP tags. Each instruction is associated with a respective connection and is sent to a respective application sub-system (e.g., application sub-systems 118-1 through **118-(*m*-1)**). In certain embodiments, each instruction instructs the respective application sub-system to open a connection between the respective application sub-system and a next application sub-system based on the connection path, generate data from data received by the respective application sub-system, transfer the generated data from the respective application sub-system to the next application sub-system via the connection, and close the connection.

At operation 216, the one or more processors send a first instruction (e.g., the instruction 158-1 of FIG. 1) to the source application sub-system (e.g., the application sub-system 118-1 of FIG. 1). The first instruction instructs the source application sub-system to open a first connection between the source application sub-system and a first intermediate application sub-system (e.g., the application sub-system 118-2) based on the connection path; transfer data 154-1 from the source application sub-system to the first intermediate application sub-system via the first connection; and close the first connection. In certain embodiments, the instruction 158-1 may also instruct the identified sub-environment (e.g., the sub-environment 132) of the source application sub-system to generate the data 154-1. In certain embodiments, instructions to transfer data 154-1 from the source application sub-system to the first intermediate application sub-system via the first connection may comprise instructions to transfer the data 154-1 from the identified sub-environment (e.g., the sub-environment 132) of the source application sub-system to the identified sub-environment (e.g., the sub-environment 138) of the first intermediate application sub-system via the first connection.

At operation 218, the one or more processors send a second instruction (e.g., the instruction 158-2 of FIG. 1) to the first intermediate application sub-system (e.g., the application sub-system 118-2). The second instruction instructs the first intermediate application sub-system to open a second connection between the first intermediate application sub-system and a second intermediate application sub-system (e.g., the application sub-system 118-3) based on the connection path; transfer data 154-2 from the first intermediate application sub-system to the second intermediate application sub-system via the second connection; and close the second connection. In certain embodiments, the instruction 158-2 may also instruct the identified sub-environment (e.g., the sub-environment 138) of the first intermediate application sub-system to generate the data 154-2 from the data 154-1. In certain embodiments, instructions to transfer data 154-2 from the first intermediate application sub-system to the second intermediate application sub-system via the second connection may comprise instructions to transfer the data 154-2 from the identified sub-environment (e.g., the sub-environment 138) of the first intermediate application sub-system to the identified sub-environment of the second intermediate application sub-system via the second connection.

At operation 220, the one or more processors send a subsequent instruction to a next intermediate application sub-system based on the connection path. The subsequent instruction instructs the next intermediate application sub-system to open a subsequent connection between the next intermediate application sub-system and a respective intermediate application sub-system based on the connection path, transfer subsequent data from the next intermediate application sub-system to the respective intermediate application sub-system via the subsequent connection, and close the subsequent connection. In certain embodiments, the subsequent instruction may also instruct the identified sub-environment of the next intermediate application sub-system to generate the subsequent data. In certain embodiments, instructions to transfer the subsequent data from the next intermediate application sub-system to the respective intermediate application sub-system via the subsequent connection may comprise instructions to transfer the subsequent data from the identified sub-environment of the next intermediate application sub-system to the identified sub-environment of the respective intermediate application sub-system via the subsequent connection.

At operation 222, the one or more processors determine if all connections between the intermediate application sub-systems have been opened. In response to determining that all connections between the intermediate application sub-systems have not been opened, the method 200 continues to operation 212. In response to determining that all connections between the intermediate application sub-systems have been opened, the method 200 continues to operation 216.

At operation 224, the one or more processors send the last instruction (e.g., the instruction 158-(*m*-1) of FIG. 1) to the last intermediate application sub-system (e.g., the application sub-system 118-(*m*-1) of FIG. 1). The last instruction instructs the last intermediate application sub-system to open the last connection between the last intermediate application sub-system and the destination application sub-system (e.g., the application sub-system 118-*m*), transfer data 154-(*m*-1) from to the last intermediate application sub-system to the destination application sub-system via the last connection, and close the last connection. In certain embodiments, the instruction 158-(*m*-1) may also instruct the identified sub-environment (e.g., the sub-environment 150) of the destination application sub-system to generate data from the data 154-(*m*-1). In certain embodiments, transfer data 154-(*m*-1) from to the last intermediate application sub-system to the destination application sub-system via the last connection may comprise instructions to transfer the data 154-(*m*-1) from the identified sub-environment (e.g., the sub-environment 144) of the last intermediate application sub-system to the identified sub-environment (e.g., the sub-environment 150) of the destination application sub-system via the last connection.

The method 200 is integrated into a practical application of efficient utilization of computing resources (such as, for example, a memory and a network bandwidth) while the system performs an interaction (such as data transfer). By determining the connection path after initiating the interaction and sequentially opening and closing the determined connections between application sub-systems, the disclosed system improves utilization of the computing resources. For example, by closing connections after respective data transfers are completed, portions of the memory and network bandwidth that are allocated to these connections are released, which leads to efficient utilization of the computing resources.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a plurality of application sub-systems; and
a control sub-system communicatively coupled to the plurality of application sub-systems, wherein the control sub-system comprises:
  a first memory storing one or more rule sets;
  an artificial intelligence algorithm that is configured, when executed, to manage interactions between the plurality of application sub-systems based on plan identification information; and
  a first processor communicatively coupled to the first memory, wherein the first processor executes the artificial intelligence algorithm to:
    receive the plan identification information from a source application sub-system of the plurality of application sub-systems, wherein the plan identification information comprises information about an interaction initiated by the source application sub-system;
    apply the one or more rule sets to the plan identification information to determine:
      the source application sub-system from the plurality of application sub-systems;
      a destination application sub-system from the plurality of application sub-systems;
      a set of intermediate application sub-systems from the plurality of application sub-systems; and
      a sequence of connections determining a connection path from the source application sub-system to the destination application sub-system via the set of intermediate application sub-systems;
    generate a sequence of instructions based on one or more of the source application sub-system, the destination application sub-system, the set of intermediate application sub-systems, and the sequence of connections, wherein each instruction is associated with a respective connection;
    electronically transmit a first instruction of the sequence of instructions to the source application sub-system, the first instruction being associated with a first connection of the sequence of connections between the source application sub-system and a first intermediate application sub-system of the set of intermediate application sub-systems, wherein the first instruction instructs the source application sub-system to:
      open the first connection between the source application sub-system and the first intermediate application sub-system;
      in response to opening the first connection, allocate a first portion of a second memory associated with the source application sub-system to the first connection;
      transfer first data from the source application sub-system to the first intermediate application sub-system via the first connection;
      close the first connection;
      in response to closing the first connection, release the allocated first portion of the second memory associated with the source application sub-system to the first connection; and
    electronically transmit a second instruction of the sequence of instructions to a last intermediate application sub-system of the set of intermediate application sub-systems, the second instruction being associated with a second connection of the sequence of connections between the last intermediate application sub-system and the destination application sub-system, wherein the second instruction instructs the last application sub-system to:
open the second connection of the sequence of connections between the last intermediate application sub-system and the destination application sub-system;
in response to opening the second connection, allocate a second portion of a third memory associated with the last intermediate application sub-system to the second connection;
transfer second data from the last intermediate application sub-system to the destination application sub-system via the second connection;
close the second connection; and
in response to closing the second connection, release the allocated second portion of the third memory associated with the last intermediate application sub-system to the second connection.

2. The system of claim 1, wherein each of the plurality of application sub-systems comprises:
a second processor configured to implement an application, wherein the application comprises one or more environments, and wherein each of the one or more environments comprises one or more sub-environments.

3. The system of claim 2, wherein applying the one or more rule sets to the plan identification information further determines:
a respective environment of each of the source application sub-system, the destination application sub-system, and the set of intermediate application sub-systems; and
a respective sub-environment of each of the determined environments.

4. The system of claim 3, wherein the first instruction further instructs the determined sub-environment of the source application sub-system to generate the first data.

5. The system of claim 3, wherein the second instruction further instructs the determined sub-environment of the last intermediate application sub-system to generate the second data.

6. The system of claim 3, wherein transferring the first data from the source application sub-system to the first intermediate application sub-system via the first connection comprises transferring the first data from the determined sub-environment of the source application sub-system to the determined sub-environment of the first intermediate application sub-system via the first connection.

7. The system of claim 1, wherein a combination of the source application sub-system, the destination application sub-system, and the set of intermediate application sub-systems is a sub-set of the plurality of application sub-systems.

8. A method comprising:
receiving, using an artificial intelligence (AI) algorithm, plan identification information from a source application sub-system of a plurality of application sub-systems, wherein the plan identification information comprises information about an interaction initiated by the source application sub-system and wherein the AI algorithm is configured to manage interactions between the plurality of application sub-systems based on the plan identification information;
applying, using the AI algorithm, one or more rule sets to the plan identification information to determine:
the source application sub-system from the plurality of application sub-systems;
a destination application sub-system from the plurality of application sub-systems;
a set of intermediate application sub-systems from the plurality of application sub-systems; and
a sequence of connections determining a connection path from the source application sub-system to the destination application sub-system via the set of intermediate application sub-systems;
generating, using the AI algorithm, a sequence of instructions based on one or more of the source application sub-system, the destination application sub-system, the set of intermediate application sub-systems, and the sequence of connections, wherein each instruction is associated with a respective connection;
electronically transmitting, using the AI algorithm, a first instruction of the sequence of instructions to the source application sub-system, the first instruction being associated with a first connection of the sequence of connections between the source application sub-system and a first intermediate application sub-system of the set of intermediate application sub-systems, wherein the first instruction instructs the source application sub-system to:
open the first connection between the source application sub-system and the first intermediate application sub-system;
in response to opening the first connection, allocate a first portion of a second memory associated with the source application sub-system to the first connection;
transfer first data from the source application sub-system to the first intermediate application sub-system via the first connection;
close the first connection;
in response to closing the first connection, release the allocated first portion of the second memory associated with the source application sub-system to the first connection; and
electronically transmitting, using the AI algorithm, a second instruction of the sequence of instructions to a last intermediate application sub-system of the set of intermediate application sub-systems, the second instruction being associated with a second connection of the sequence of connections between the last intermediate application sub-system and the destination application sub-system, wherein the second instruction instructs the last application sub-system to:
open the second connection of the sequence of connections between the last intermediate application sub-system and the destination application sub-system;
in response to opening the second connection, allocate a second portion of a third memory associated with the last intermediate application sub-system to the second connection;
transfer second data from the last intermediate application sub-system to the destination application sub-system via the second connection;
close the second connection; and
in response to closing the second connection, release the allocated second portion of the third memory associated with the last intermediate application sub-system to the second connection.

9. The method of claim 8, wherein each of the plurality of application sub-systems comprises:
- a second processor configured to implement an application, wherein the application comprises one or more environments, and wherein each of the one or more environments comprises one or more sub-environments.

10. The method of claim 9, wherein applying the one or more rule sets to the plan identification information further determines:
- a respective environment of each of the source application sub-system, the destination application sub-system, and the set of intermediate application sub-systems; and
- a respective sub-environment of each of the determined environments.

11. The method of claim 10, wherein the first instruction further instructs the determined sub-environment of the source application sub-system to generate the first data.

12. The method of claim 10, wherein the second instruction further instructs the determined sub-environment of the last intermediate application sub-system to generate the second data.

13. The method of claim 10, wherein transferring the first data from the source application sub-system to the first intermediate application sub-system via the first connection comprises transferring the first data from the determined sub-environment of the source application sub-system to the determined sub-environment of the first intermediate application sub-system via the first connection.

14. The method of claim 8, wherein a combination of the source application sub-system, the destination application sub-system, and the set of intermediate application sub-systems is a sub-set of the plurality of application sub-systems.

15. A non-transitory computer-readable medium storing instructions that, when executed by a processor, cause the processor to:
- receive, using an artificial intelligence (AI) algorithm, plan identification information from a source application sub-system of a plurality of application sub-systems, wherein the plan identification information comprises information about an interaction initiated by the source application sub-system and wherein the AI algorithm is configured to manage interactions between the plurality of application sub-systems based the plan identification information;
- apply, using the AI algorithm, one or more rule sets to the plan identification information to determine:
  - the source application sub-system from the plurality of application sub-systems;
  - a destination application sub-system from the plurality of application sub-systems;
  - a set of intermediate application sub-systems from the plurality of application sub-systems; and
  - a sequence of connections determining a connection path from the source application sub-system to the destination application sub-system via the set of intermediate application sub-systems;
- generate, using the AI algorithm, a sequence of instructions based on one or more of the source application sub-system, the destination application sub-system, the set of intermediate application sub-systems, and the sequence of connections, wherein each instruction is associated with a respective connection;
- electronically transmit, using the AI algorithm, a first instruction of the sequence of instructions to the source application sub-system, the first instruction being associated with a first connection of the sequence of connections between the source application sub-system and a first intermediate application sub-system of the set of intermediate application sub-systems, wherein the first instruction instructs the source application sub-system to:
  - open the first connection between the source application sub-system and the first intermediate application sub-system;
  - in response to opening the first connection, allocate a first portion of a second memory associated with the source application sub-system to the first connection;
  - transfer first data from the source application sub-system to the first intermediate application sub-system via the first connection;
  - close the first connection;
  - in response to closing the first connection, release the allocated first portion of the second memory associated with the source application sub-system to the first connection; and
- electronically transmit, using the AI algorithm, a second instruction of the sequence of instructions to a last intermediate application sub-system of the set of intermediate application sub-systems, the second instruction being associated with a second connection of the sequence of connections between the last intermediate application sub-system and the destination application sub-system, wherein the second instruction instructs the last application sub-system to:
  - open the second connection of the sequence of connections between the last intermediate application sub-system and the destination application sub-system;
  - in response to opening the second connection, allocate a second portion of a third memory associated with the last intermediate application sub-system to the second connection;
  - transfer second data from the last intermediate application sub-system to the destination application sub-system via the second connection;
  - close the second connection; and
  - in response to closing the second connection, release the allocated second portion of the third memory associated with the last intermediate application sub-system to the second connection.

16. The non-transitory computer-readable medium of claim 15, wherein each of the plurality of application sub-systems comprises:
- a second processor configured to implement an application, wherein the application comprises one or more environments, and wherein each of the one or more environments comprises one or more sub-environments.

17. The non-transitory computer-readable medium of claim 16, wherein applying the one or more rule sets to the plan identification information further determines:
- a respective environment of each of the source application sub-system, the destination application sub-system, and the set of intermediate application sub-systems; and
- a respective sub-environment of each of the determined environments.

18. The non-transitory computer-readable medium of claim 17, wherein the first instruction further instructs the determined sub-environment of the source application sub-system to generate the first data.

19. The non-transitory computer-readable medium of claim 17, wherein the second instruction further instructs the determined sub-environment of the last intermediate application sub-system to generate the second data.

20. The non-transitory computer-readable medium of claim 17, wherein transferring the first data from the source application sub-system to the first intermediate application sub-system via the first connection comprises transferring the first data from the determined sub-environment of the source application sub-system to the determined sub-environment of the first intermediate application sub-system via the first connection.

\* \* \* \* \*